(12) United States Patent
Chai

(10) Patent No.: US 12,120,327 B2
(45) Date of Patent: Oct. 15, 2024

(54) METHOD FOR PROCESSING LCEVC ENHANCEMENT LAYER OF RESIDUALS

(71) Applicant: Realtek Semiconductor Corp., HsinChu (TW)

(72) Inventor: Chi-Wang Chai, Santa Clara, CA (US)

(73) Assignee: Realtek Semiconductor Corp., HsinChu (TW)

( * ) Notice: Subject to any disclaimer, the term of this patent is extended or adjusted under 35 U.S.C. 154(b) by 73 days.

(21) Appl. No.: 18/104,769

(22) Filed: Feb. 1, 2023

(65) Prior Publication Data

US 2024/0259577 A1 Aug. 1, 2024

(51) Int. Cl.
*H04N 19/30* (2014.01)
*H04N 19/182* (2014.01)
*H04N 19/186* (2014.01)

(52) U.S. Cl.
CPC ........... *H04N 19/30* (2014.11); *H04N 19/182* (2014.11); *H04N 19/186* (2014.11)

(58) Field of Classification Search
CPC ..... H04N 19/30; H04N 19/182; H04N 19/186
See application file for complete search history.

(56) References Cited

U.S. PATENT DOCUMENTS

2022/0400270 A1* 12/2022 Meardi ............... H04N 19/176
2024/0155132 A1* 5/2024 Maurer ................ H04N 19/14

FOREIGN PATENT DOCUMENTS

TW 201444344 A 11/2014
TW 202234348 A 9/2022
WO WO-2023227911 A1 * 11/2023 ........... H04N 19/112

* cited by examiner

*Primary Examiner* — Rowina J Cattungal
(74) *Attorney, Agent, or Firm* — Winston Hsu

(57) ABSTRACT

The present invention provides a receiver including a decoder, an upscale circuit and a color space conversion circuit. The decoder is configured to decode a video stream to generate a base layer and an enhancement layer. The upscale circuit is configured to perform an upscaling operation on the base layer to generate an upscaled base layer, wherein the upscaled base layer comprises luminance values of a plurality of pixels of a frame, and the enhancement layer comprises residuals of the plurality of pixels of the frame. The color space conversion circuit is configured to use a conversion matrix to combine the upscaled base layer and the enhancement layer to generate output video data.

10 Claims, 3 Drawing Sheets

$$\begin{bmatrix} Y' \\ Cb' \\ Cr' \end{bmatrix} = \begin{bmatrix} 1 & 1 & -1 \\ 0 & 0 & 0 \\ 0 & 0 & 0 \end{bmatrix} \begin{bmatrix} Y \\ Cb = YP \\ Cr = |YN| \end{bmatrix}$$

| Upscaled base layer | Y11 | Y12 | Y13 | ...... | Y1n |
| | Y21 | Y22 | Y23 | ...... | Y2n |
| | ⋮ | ⋮ | ⋮ | ...... | ⋮ |
| | Ym1 | Ym2 | Ym3 | ...... | Ymn |

| Enhancement layer of residuals | E11 | E12 | E13 | ...... | E1n |
| | E21 | E22 | E23 | ...... | E2n |
| | ⋮ | ⋮ | ⋮ | ...... | ⋮ |
| | Em1 | Em2 | Em3 | ...... | Emn |

E11 - Emn may be positive value (YP) or negative value (YN)

FIG. 2

$$\begin{bmatrix} Y' \\ Cb' \\ Cr' \end{bmatrix} = \begin{bmatrix} 1 & 1 & -1 \\ 0 & 0 & 0 \\ 0 & 0 & 0 \end{bmatrix} \begin{bmatrix} Y \\ Cb = YP \\ Cr = |YN| \end{bmatrix}$$

FIG. 3

METHOD FOR PROCESSING LCEVC ENHANCEMENT LAYER OF RESIDUALS

BACKGROUND OF THE INVENTION

1. Field of the Invention

The present invention relates to a receiver configured to process a video stream.

2. Description of the Prior Art

MPEG-5 Part 2 Low Complexity Enhancement Video Coding (LCEVC) is a video coding standard that becomes popular in some countries. The LCEVC comprises at least two layers, a base layer and an enhancement layer. The base layer is usually downscaled from the original video in both X and Y dimensions and is then encoded by any one of standard video encoder such as HEVC (High Efficiency Video Coding) encoder or H.264 encoder, or VVC (Versatile Video Coding) encoder, to generate an encoded base layer. Then, a reconstructed base layer is generated according to the encoded base layer (e.g., by decoding the encoded base layer), the reconstructed base layer is upscaled to the original resolution, and the upscaled reconstructed base layer is subtracted from the original pixels to generate the enhancement layer (i.e., enhancement layer of residuals). The enhancement layer is further entropy encoded, and the encoded base layer and the encoded enhancement layer are sent to a decoder in a receiver side.

However, the residual of each pixel in the enhancement layer may be positive value or negative value, and the receiver within a set-top box or a television may be difficult to process the residual with negative value, so that the original video data cannot be easily obtained. Therefore, one possible solution is to design a new chip capable of processing the data conforming the LCEVC standard, however, designing the new chip would incur significant design and manufacturing costs.

SUMMARY OF THE INVENTION

It is therefore an objective of the present invention to provide a receiver for processing video stream conforming the LCEVC standard, which can use a color space conversion circuit that is already in the receiver to process the enhancement layer of residuals, to solve the above-mentioned problems.

According to one embodiment of the present invention, a receiver comprising a decoder, an upscale circuit and a color space conversion circuit is disclosed. The decoder is configured to decode a video stream to generate a base layer and an enhancement layer. The upscale circuit is configured to perform an upscaling operation on the base layer to generate an upscaled base layer, wherein the upscaled base layer comprises luminance values of a plurality of pixels of a frame, and the enhancement layer comprises residuals of the plurality of pixels of the frame. The color space conversion circuit is configured to use a conversion matrix to combine the upscaled base layer and the enhancement layer to generate output video data.

According to one embodiment of the present invention, a signal processing method comprises the steps of: decoding a video stream to generate a base layer and an enhancement layer; performing an upscaling operation on the base layer to generate an upscaled base layer, wherein the upscaled base layer comprises luminance values of a plurality of pixels of a frame, and the enhancement layer comprises residuals of the plurality of pixels of the frame; and using a color space conversion circuit to use a conversion matrix to combine the upscaled base layer and the enhancement layer to generate output video data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 shows upscaled base layer and enhancement layer of residuals according to one embodiment of the present invention.

FIG. 3 is a diagram illustrating using a color space conversion operation to combine the upscaled base layer and enhancement layer of residuals according to one embodiment of the present invention.

DETAILED DESCRIPTION

Figure 1:
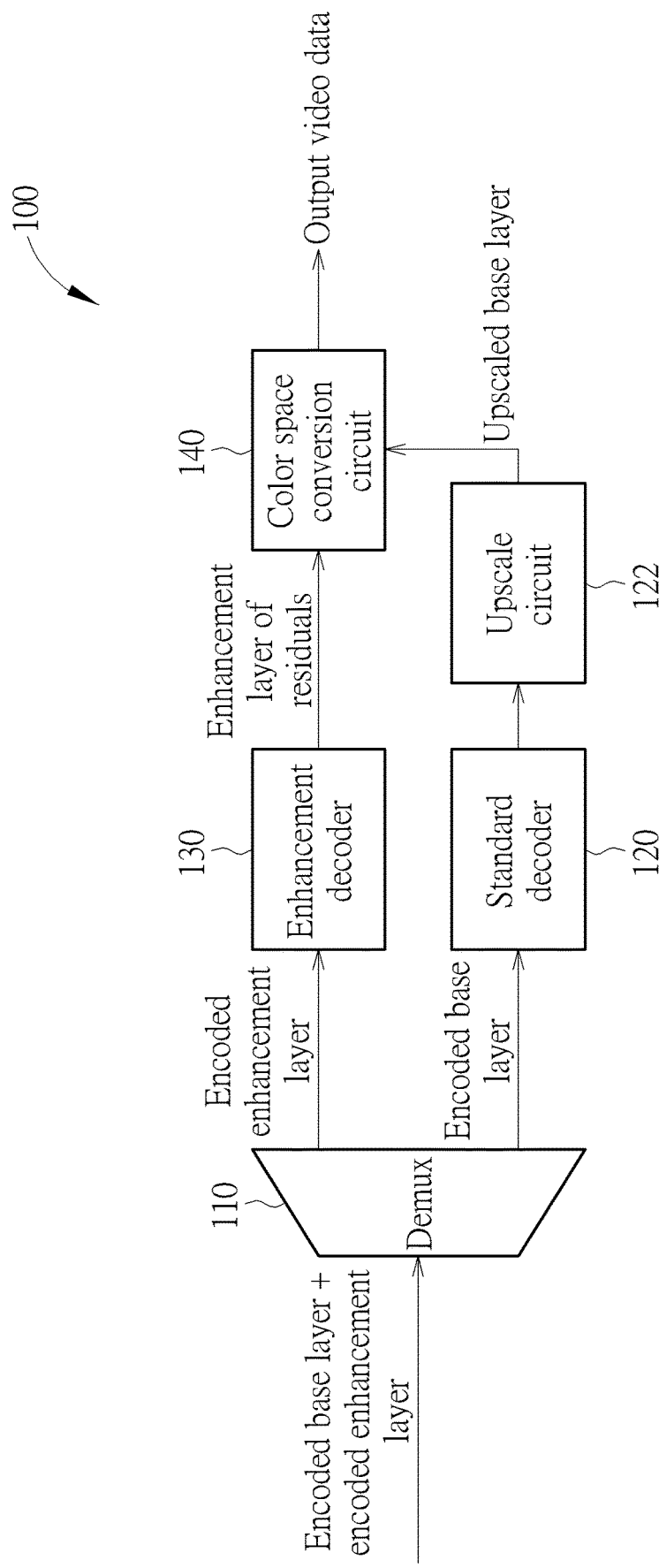
FIG. 1 is a diagram illustrating a receiver according to one embodiment of the present invention.

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

FIG. 1 is a diagram illustrating a receiver 100 according to one embodiment of the present invention, wherein the receiver 100 can be positioned in a set-top box, a television or any display device, and the receiver 100 is configured to receive encoded video stream to generate output video data to a display panel for display. As shown in FIG. 1, the receiver 100 comprises a demultiplexer 110, a standard decoder 120, an upscale circuit 122, an enhancement decoder 130 and a color space conversion circuit 140. In this embodiment, the receiver 100 is capable of processing the video stream conforming the LCEVC specifications, that is the received video stream comprises an encoded base layer and an encoded enhancement layer.

In the operation of the receiver 100, the demultiplexer 110 receives the video stream comprising the encoded base layer and the encoded enhancement layer, and the demultiplexer 110 outputs the encoded base layer and the encoded enhancement layer to the standard decoder 120 and the enhancement decoder 130, respectively. The base layer is a low-resolution encoded image data generated by any existing codec, such as H.264, HEVC, VP9, AV1, or VVC, and the enhancement layer provides additional detail and resolution such as a residual of each pixel value, and the enhancement layer is encoded using the LCEVC codec. In this embodiment, the encoded base layer carried by the video stream is downscaled in both X and Y dimensions from the original video in a transmitter side. In addition, because the base layer and the enhancement layer have been described in LCEVC specification and related articles, detailed descriptions about these two layers are omitted here.

The standard decoder 120 can be any existing decoder such as H.264, HEVC, VP9, VVC, or AV1 decoder, and the standard decoder 120 is configured to decode the encoded base layer from the demultiplexer 110 to generate a base layer. Then, the upscale circuit 122 performs an upscaling operation on the base layer to generate an upscaled base layer, wherein the upscale circuit 122 may upscale a size/resolution of the base layer by using any suitable algorithm such as interpolation. The upscaled base layer generated by the upscale circuit 122 is shown in FIG. 2, wherein the upscaled base layer comprises luminance values Y11-Ymn (upscaled luminance values) corresponding to a plurality of pixels of a frame. The enhancement decoder 130 can be implemented by hardware or software for decoding the encoded enhancement layer from the demultiplexer 110 to generate the enhancement layer of residuals. The enhancement layer of residuals generated by the enhancement decoder 130 is shown in FIG. 2, wherein the enhancement layer of residuals comprise residuals E11-Emn corresponding to the plurality of pixels of the frame. In this embodiment, each of the residuals E11-Emn may be positive value or negative value, wherein the residual with positive value is named "YP" in the following description, and the residual with negative value is named "YN" in the following description. In this embodiment, the upscaled base layer and the enhancement layer of residuals have the same resolution.

It is noted that the operations of the standard decoder 120 and the enhancement decoder 130 are known by a person skilled in the art, so the detailed descriptions about these two decoders are omitted here.

After the upscaled base layer and the enhancement layer of residuals are generated or partially generated, it is required to combine the upscaled base layer and the enhancement layer of residuals to generate the output video data. One method is to design a specific circuit to do the combination. However, in order to save the designing and manufacturing costs, a well-developed color space conversion circuit can be configured to do the combination. In this embodiment, the color space conversion circuit 140 is configured to combine the upscaled base layer and the enhancement layer of residuals to generate the output video data. Specifically, the color space conversion circuit 140 was originally used to convert image data into different color domain, for example, the color space conversion circuit 140 may be used to convert image data with YCrCb color domain into image data with RGB color domain. In this embodiment, however, the parameters of a conversion matrix used in the color space conversion circuit 140 are redefined for the calculation of combining the upscaled base layer and the enhancement layer of residuals instead of the calculation of converting image data into different color domain. In detail, referring to FIG. 3, the color space conversion circuit 140 was originally used to convert luma component Y and chroma components Cb and Cr into components Y', Cb' and Cr' of other color domain. However, in this embodiment, the parameters of Y, Cb, Cr and the conversion matrix are redefined for the calculation of combining the upscaled base layer and the enhancement layer of residuals such that the compensated luminance can be obtained as Y'. Specifically, the conversion matrix is set to have values (1, 1, −1) in the first row, the values of the second row and the third row within the matrix are set to be zero; for each pixel, the input component Y is the luminance value in the upscaled base layer, for example, the luminance Y11, Y12, or Ymn shown in FIG. 2; for each pixel, if the residual is a positive value YP, the input component Cb is set to be "YP", and the input component Cr is set to be zero; and for each pixel, if the residual is a negative value YN, the input component Cb is set to be zero, and the input component Cr is set to be an absolute value of YN, that is Cr is equal to "|YN|".

By using the color space conversion circuit 140, a compensated luminance of each pixel can be effectively obtained. Taking a first pixel shown in FIG. 2 as an example, if the residual E11 is a positive value, the color space conversion circuit 140 performs the calculation "1*Y11+1*YP-1*0" to generate the compensated luminance Y'; and if the residual E11 is a negative value, the color space conversion circuit 140 performs the calculation "1*Y11+1*0-1*|YN|" to generate the compensated luminance Y'. Therefore, the upscaled base layer and the enhancement layer of residuals can be effectively combined to generate output video data. In this embodiment, the values of Cb' and Cr' are not needed and can be discarded.

It is noted that the setting of the color space conversion circuit 140 shown in FIG. 3 is for illustrative purposes only, not a limitation of the present invention. In another embodiment, the conversion matrix can be set to have values (1, 1, −1) in any one of the three rows. For example, if the conversion matrix is set to have values (1, 1, −1) in the second row, and the values of the first row and the third row are set to be zero, the component Cb' can be used as the compensated luminance. In another example, if the conversion matrix is set to have values (1, 1, −1) in the third row, and the values of the first row and the second row are set to be zero, the component Cr' can be used as the compensated luminance.

In another example, the conversion matrix can be set to have values (1, −1, 1) in any one of the three rows. At this time, for each pixel, if the residual is a positive value YP, the input component Cr is set to be "YP", and the input component Cb is set to be zero; and for each pixel, if the residual is a negative value YN, the input component Cr is set to be zero, and the input component Cb is set to be an absolute value of YN, that is Cb is equal to "|YN|".

In this embodiment, the upscaled base layer comprises three components of color space such as Y, Cb and Cr, but only the component Y is required to use the color space conversion circuit 140 to generate the compensated luminance Y', that is the components Cb and Cr in the upscaled base layer are directly served as part of the output video data.

In another embodiment, the upscaled base layer comprises three components of color space such as Y, Cb and Cr, and the enhancement layer also comprises residuals of three components, that is the residuals of three components comprise residual of luma component Y, residual of chroma component Cb and residual of chroma component Cr. At this time, the color space conversion circuit 140 can also generate compensated chroma Cb' and/or compensated chroma Cb' by using the similar operation shown in FIG. 3. For example, in a first cycle, the color space conversion circuit 140 may use the component Y in the upscaled base layer and the corresponding residual in the enhancement layer to generate the compensated luminance Y'; in a second cycle, the color space conversion circuit 140 may use the component Cb in the upscaled base layer and the corresponding residual in the enhancement layer to generate the compensated chroma Cb', wherein the conversion matrix used in the second cycle may have (1, 1, −1) or (1, −1, 1) in the second row, and the values of the first row and the third row are all zero; and in a third cycle, the color space conversion circuit 140 may use the component Cr in the upscaled base layer and the corresponding residual in the enhancement layer to generate the compensated chroma Cr', wherein the conversion matrix used in the third cycle may have (1, 1, −1) or (1, −1, 1) in the third row, and the values of the first row and the second row are all zero.

Briefly summarized, in the embodiments of the present invention, by using the color space conversion circuit that was originally designed in the receiver to combine the upscaled base layer and the enhancement layer of residuals to generate the output video data, the receiver can effectively process the video stream conforming the LCEVC specification. Therefore, the engineer does not need to design a new chip for processing the video stream conforming the LCEVC specification, so that the design and manufacturing costs can be greatly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver, comprising:
    a decoder, configured to decode a video stream to generate a base layer and an enhancement layer;
    an upscale circuit, configured to perform an upscaling operation on the base layer to generate an upscaled base layer, wherein the upscaled base layer comprises luminance values of a plurality of pixels of a frame, and the enhancement layer comprises residuals of the plurality of pixels of the frame; and
    a color space conversion circuit, coupled to the decoder, configured to use a conversion matrix to combine the upscaled base layer and the enhancement layer to generate output video data;
    wherein for each pixel of the frame, input components of the color space conversion circuit are generated based on a determination indicating if the corresponding residual is a positive value or a negative value;
    wherein the conversion matrix is a 3*3 matrix, one of three rows of the conversion matrix has values (1, 1, −1); and for each pixel of the frame, if the corresponding residual is the positive value, three input components of the color space conversion circuit are a luminance value in the upscaled base layer, the corresponding residual in the enhancement layer, and zero, respectively; and if the corresponding residual is the negative value, the three input components of the color space conversion circuit are the luminance value in the upscaled base layer, zero, and an absolute value of the corresponding residual in the enhancement layer, respectively.

2. The receiver of claim 1, wherein the upscaled base layer further comprises chroma values of the plurality of pixels of the frame, and the color space conversion circuit is configured to multiply the conversion matrix and the three input components to generate a compensated luminance in a first cycle; and in a second cycle, if the corresponding residual is the positive value, three input components of the color space conversion circuit are a chroma value in the upscaled base layer, the corresponding residual in the enhancement layer, and zero, respectively; and if the corresponding residual is the negative value, the three input components of the color space conversion circuit are the chroma value in the upscaled base layer, zero, and an absolute value of the corresponding residual in the enhancement layer, respectively; and the color space conversion circuit is configured to multiply the conversion matrix and the three input components to generate a compensated chroma in the second cycle.

3. The receiver of claim 1, wherein the upscaled base layer and the enhancement layer have a same resolution.

4. The receiver of claim 1, wherein the video stream conforms a Low Complexity Enhancement Video Coding (LCEVC) specification.

5. A receiver, comprising:
    a decoder, configured to decode a video stream to generate a base layer and an enhancement layer;
    an upscale circuit, configured to perform an upscaling operation on the base layer to generate an upscaled base layer, wherein the upscaled base layer comprises luminance values of a plurality of pixels of a frame, and the enhancement layer comprises residuals of the plurality of pixels of the frame; and
    a color space conversion circuit, coupled to the decoder, configured to use a conversion matrix to combine the upscaled base layer and the enhancement layer to generate output video data;
    wherein for each pixel of the frame, input components of the color space conversion circuit are generated based on a determination indicating if the corresponding residual is a positive value or a negative value;
    wherein the conversion matrix is a 3*3 matrix, one of three rows of the conversion matrix has values (1, −1, 1); and for each pixel of the frame, if the corresponding residual is the positive value, three input components of the color space conversion circuit are a luminance value in the upscaled base layer, zero and the corresponding residual in the enhancement layer, respectively; and if the corresponding residual is the negative value, the three input components of the color space conversion circuit are the luminance value in the upscaled base layer, an absolute value of the corresponding residual in the enhancement layer, and zero, respectively.

6. The receiver of claim 5, wherein the upscaled base layer further comprises chroma values of the plurality of pixels of the frame, and the color space conversion circuit is configured to multiply the conversion matrix and the three input components to generate a compensated luminance in a first cycle; and in a second cycle, if the corresponding residual is the positive value, three input components of the color space conversion circuit are a luminance value in the upscaled base layer, zero and the corresponding residual in the enhancement layer, respectively; and if the corresponding residual is the negative value, the three input components of the color space conversion circuit are the luminance value in the upscaled base layer, an absolute value of the corresponding residual in the enhancement layer, and zero, respectively; and the color space conversion circuit is configured to multiply the conversion matrix and the three input components to generate a compensated chroma in the second cycle.

7. A signal processing method, comprising:
    decoding a video stream to generate a base layer and an enhancement layer;
    performing an upscaling operation on the base layer to generate an upscaled base layer, wherein the upscaled base layer comprises luminance values of a plurality of pixels of a frame, and the enhancement layer comprises residuals of the plurality of pixels of the frame;

using a color space conversion circuit to use a conversion matrix to combine the upscaled base layer and the enhancement layer to generate output video data; and for each pixel of the frame, generating input components of the color space conversion circuit based on a determination indicating if the corresponding residual is a positive value or a negative value;

wherein the conversion matrix is a 3*3 matrix, one of three rows of the conversion matrix has values (1, 1, −1); and the step of generating the input components of the color space conversion circuit based on the determination indicating if the corresponding residual is the positive value or the negative value comprises:

for each pixel of the frame, if the corresponding residual is the positive value, three input components of the color space conversion circuit are a luminance value in the upscaled base layer, the corresponding residual in the enhancement layer, and zero, respectively; and if the corresponding residual is the negative value, the three input components of the color space conversion circuit are the luminance value in the upscaled base layer, zero, and an absolute value of the corresponding residual in the enhancement layer, respectively.

8. The signal processing method of claim 7, wherein the upscaled base layer further comprises chroma values of the plurality of pixels of the frame, and the color space conversion circuit is configured to multiply the conversion matrix and the three input components to generate a compensated luminance in a first cycle; and the signal processing method further comprises:

in a second cycle, using the color space conversion circuit to multiply the conversion matrix and the three input components to generate a compensated chroma;

wherein in the second cycle if the corresponding residual is the positive value, three input components of the color space conversion circuit are a chroma value in the upscaled base layer, the corresponding residual in the enhancement layer, and zero, respectively; and if the corresponding residual is the negative value, the three input components of the color space conversion circuit are the chroma value in the upscaled base layer, zero, and an absolute value of the corresponding residual in the enhancement layer, respectively.

9. The signal processing method of claim 7, wherein the upscaled base layer and the enhancement layer have a same resolution.

10. The signal processing method of claim 7, wherein the video stream conforms a Low Complexity Enhancement Video Coding (LCEVC) specification.

* * * * *